(12) United States Patent
Trail et al.

(10) Patent No.: US 10,914,956 B1
(45) Date of Patent: Feb. 9, 2021

(54) TILED DISPLAY ASSEMBLIES FOR ARTIFICIAL REALITY HEADSET

(71) Applicant: Facebook Technologies, LLC, Menlo Park, CA (US)

(72) Inventors: Nicholas Daniel Trail, Bothell, WA (US); Andrew John Ouderkirk, Redmond, WA (US); Pasi Saarikko, Kirkland, WA (US); Sharvil Shailesh Talati, Seattle, WA (US); Hee Yoon Lee, Redmond, WA (US); Behnam Bastani, Palo Alto, CA (US); Hagar Edelstain, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 63 days.

(21) Appl. No.: 16/360,911

(22) Filed: Mar. 21, 2019

(51) Int. Cl.
| | |
|---|---|
| G02B 27/01 | (2006.01) |
| G06F 3/01 | (2006.01) |
| G06K 9/32 | (2006.01) |
| G06F 3/14 | (2006.01) |
| G06T 7/50 | (2017.01) |
| G02B 6/122 | (2006.01) |

(52) U.S. Cl.
CPC ......... G02B 27/0172 (2013.01); G02B 6/122 (2013.01); G06F 3/013 (2013.01); G06F 3/1446 (2013.01); G06K 9/3233 (2013.01); G06T 7/50 (2017.01)

(58) Field of Classification Search
CPC ...... G02B 27/0172; G02B 6/122; G06T 7/50; G06F 3/013; G06F 3/1446; G06K 9/3233
See application file for complete search history.

(56) References Cited

U.S. PATENT DOCUMENTS

| | | | |
|---|---|---|---|
| 10,775,626 B1* | 9/2020 | Stratton | .................. G02B 6/122 |
| 2002/0181115 A1* | 12/2002 | Massof | .............. G02B 27/0172 |
| | | | 359/630 |
| 2006/0066730 A1 | 3/2006 | Evans, Jr. et al. | |
| 2015/0309312 A1 | 10/2015 | Alton et al. | |
| 2016/0018645 A1 | 1/2016 | Haddick et al. | |
| 2016/0370855 A1* | 12/2016 | Lanier | ..................... G06F 3/005 |
| 2017/0115489 A1 | 4/2017 | Hu et al. | |
| 2017/0357089 A1* | 12/2017 | Tervo | ..................... G02B 6/005 |
| 2017/0371162 A1* | 12/2017 | Makino | ............. G02B 27/0172 |
| 2019/0285905 A1 | 9/2019 | Tam et al. | |

OTHER PUBLICATIONS

United States Office Action, U.S. Appl. No. 16/379,703, dated May 22, 2020, 41 pages.
United States Office Action, U.S. Appl. No. 16/379,703, dated Sep. 21, 2020, 43 pages.

* cited by examiner

*Primary Examiner* — Dmitriy Bolotin
(74) *Attorney, Agent, or Firm* — Fenwick & West LLP

(57) ABSTRACT

A headset includes a first waveguide display and a second waveguide display. The first waveguide display is configured to emit a first portion of image light, the first waveguide display having a first field of view (FOV). The second display assembly is configured to emit a second portion of the image light, and the second display assembly has a second FOV. The first waveguide display and the second display assembly are tiled such that the emitted first portion of image light and the emitted second portion of image light create a tiled FOV from a perspective of an eyebox. And a seam between the first FOV and the second FOV is located in a peripheral region of the tiled FOV.

18 Claims, 7 Drawing Sheets

TILED DISPLAY ASSEMBLIES FOR ARTIFICIAL REALITY HEADSET

BACKGROUND

The present disclosure generally relates to headsets, and specifically relates to tiled display assemblies for artificial reality headsets.

Near-eye displays (NEDs) are used to display various media to users. NEDs are designed to show users realistic media displays, such that the media covers the field of view of a user. NEDs in virtual reality (VR) systems and/or augmented reality (AR) systems may be required to be compact and light weight, and to provide large exit pupil with a wide field-of-vision for ease of use. However, designing a NED with a wide field-of-view can result in rather large lenses, and a relatively bulky and heavy NED, which can make is unsuitable for AR/VR applications.

SUMMARY

Described herein are embodiments that relate to tiled display assemblies for use in artificial reality headsets. A headset includes a display block. The display block generates image light and directs it to an eyebox of the headset. The display block includes a plurality of display assemblies that are tiled together. A display assembly generates a least a portion of the image light and directs the generated portion to the eyebox. A display assembly may be a waveguide display, a projector display, or an electronic display.

In some embodiments, at least one of the display assemblies is a waveguide display. Accordingly, the display block may include a first waveguide display and a second display assembly. The first waveguide display may be configured to emit a first portion of image light, and the first waveguide display has a first field of view (FOV). The second display assembly (e.g., another waveguide display, a projector display, etc.) may be configured to emit a second portion of the image light, and the second display assembly has a second FOV. The first waveguide display and the second display assembly are tiled such that the emitted first portion of image light and the emitted second portion of image light create a tiled FOV from the perspective of an eyebox. And a seam between the first FOV and the second FOV is located in a peripheral region of the tiled FOV.

Figure 1A:
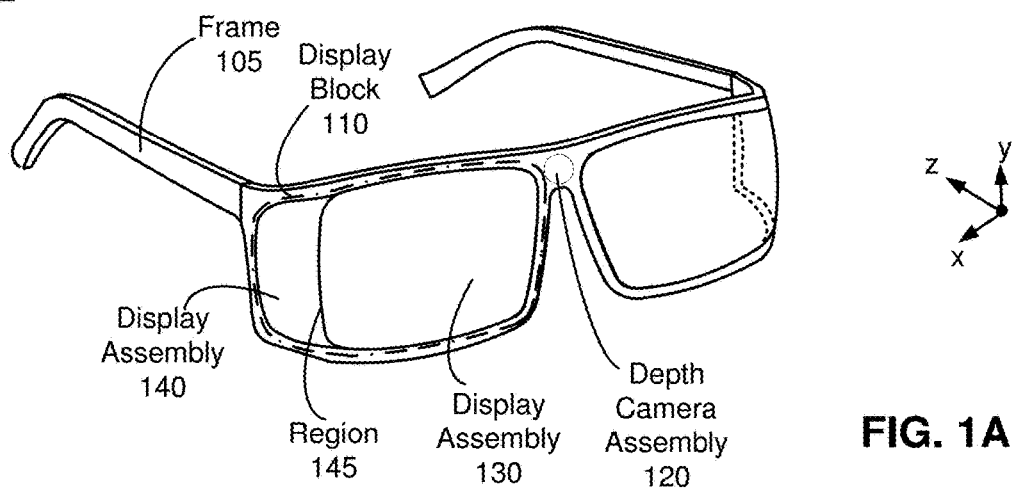
FIG. 1A is a diagram of a headset, in accordance with one or more embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Embodiments described here relate to tiled displays for use in artificial reality headsets. A headset includes a display block for each eye. A display block generates image light and presents the image light a corresponding eyebox of the headset. The display block includes a plurality of display assemblies that are tiled such that light emitted from each of the plurality of display assemblies are tiled together to form a tiled field of view (FOV). A display assembly may be, e.g., a waveguide display, an electronic display, a projector display, or some other device that generates at least a portion of the image light, or some combination thereof.

The display block includes at least a first display assembly and a second display assembly (also referred to as a peripheral display assembly) that are tiled such that the first display assembly emits a first portion of the image light over a first field of view (FOV), and the second display assembly emits a second portion of the image light over a second FOV. The first display assembly is positioned to be a main display whose FOV generally corresponds to gaze locations in front of a user (e.g., user is looking straight ahead). A main display has a FOV that includes a central region in front of a user which is likely to include a gaze location (i.e., a foveal FOV of the eye) of the user. Note that the FOV of the main display may also include some portion of the FOV that is outside of the central region.

The second display assembly is positioned to be a peripheral display whose FOV is at least a threshold distance from the central region. For example, the FOV of a second display assembly may correspond to the eye looking towards a temple of the user (i.e., to a user's right or left). In some embodiments, the first FOV and the second FOV overlap. For example, the first FOV may be −30 degrees to +30 degrees, and the second FOV may be 20 degrees to 60 degrees. In other embodiments, there is no overlap between the first FOV and the second FOV, but there is a spatial overlap of at least a portion of the first display assembly with at least a portion of the second display assembly.

The first FOV and the second FOV create a tiled FOV from the perspective of an eyebox. Accordingly, the tiled FOV can generally be broken into the central region and a peripheral region. The central region corresponds to gaze locations generally in front of a user, and the peripheral region generally corresponds to locations outside of the central region.

A seam between the first FOV and the second FOV is located in the peripheral region of the tiled FOV. For example, the seam may be located at least 35 degrees off center, where center is a location that corresponds to a gaze location of an eye of a user of the headset who is looking substantially straight ahead. In some embodiments, center is a central point of the center region. Note that placing the seam in the peripheral region of the tiled FOV mitigates chances of the user seeing it as it would generally be outside a foveal region of user's gaze. Moreover, as described in detail below various techniques may also be used to further mitigate visibility of the seam.

In some embodiments, the display block includes at least one waveguide display. For example, the display block may include a first waveguide display and a second display assembly. The first waveguide display is configured to emit a first portion of image light. As described in detail below the first waveguide display includes one or more source assemblies, a waveguide, one or more coupling elements (e.g., gratings), and one or more decoupling elements (e.g., gratings). The first waveguide display emits the first portion of the image light over the first field of view (FOV).

The second display assembly is configured to emit a second portion of the image light, and the second display assembly has the second FOV. The second display assembly may be, e.g., another waveguide display, a projector display, or an electronic display. The first waveguide display and the second display assembly are tiled such that the emitted first portion of image light and the emitted second portion of image light create the tiled FOV from the perspective of the eyebox. And a seam between the first FOV and the second FOV is located in a peripheral region of the tiled FOV Various embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD or near-eye display (NED) connected to a host computer system, a standalone HMD, a standalone NED, a mobile device or computing system, or any other hardware platform capable of providing artificial reality content to one or more viewers.

FIG. 1A is a diagram of a headset 100, in accordance with one or more embodiments. In the illustrated embodiment, the headset 100 is a NED. Note in embodiments not shown the headset 100 may be a head-mounted display (HMD) or some other display that is coupled to a head of the user. The headset 100 presents content to a user. Examples of content presented by the headset 100 include one or more images (e.g., image light), video (e.g., image light), audio, or some combination thereof. In some embodiments, audio is presented via an external device (e.g., speakers and/or headphones) that receives audio information from the headset 100, a console (not shown), or both, and presents audio data based on the audio information. The headset 100 is configured to operate as an artificial reality headset. For example, the headset 100 may operate as a VR headset, an AR headset, a MR headset, or some combination thereof.

The headset 100 shown in FIG. 1A includes a frame 105, a display block 110, and optionally includes one or more depth camera assemblies (DCAs) 120. The frame 105 is coupled to one or more optical elements which together display media to users. In some embodiments, the frame 105 may represent a frame of eye-wear glasses.

The display block 110 is configured to present content to a user. The display block 110 includes a plurality of display assemblies that are tiled together. In FIG. 1A, the display block includes a display assembly 130 and a display assembly 140. However, other embodiments there are more than two display assemblies that are tiled together.

The display assembly 130 and the display assembly 140 are tiled such that the display assembly 130 emits a first portion of the image light over a first field of view (FOV), and the display assembly emits a second portion of the image light over a second FOV. The display assembly 130 is positioned to be a main display whose FOV generally corresponds to gaze locations in front of a user (e.g., user is looking straight ahead). In contrast, the display assembly 140 is positioned to be a peripheral display whose FOV generally corresponds to gaze locations towards a temple of the user (e.g., to a user's right). As discussed below, the first FOV and the second FOV create a tiled FOV from the perspective of an eyebox. Accordingly, the tiled FOV can generally be broken into a central region and a peripheral region. The central region corresponds to gaze locations generally in front of a user, and the peripheral region generally corresponds to locations outside of the central region. The central region and peripheral region are described in detail below with regard to FIG. 2.

The display assembly 140 is canted relative to the display assembly 130, such that the display assembly 140 abuts the display assembly 130 at an angle in a region 145. Additionally, in some embodiments, the display assembly 130 and/or the display assembly 140 may also be curved. Note that the region 145 where the display assembly 130 abuts the display assembly 140 can cause a seam to appear in the tiled FOV. The region 145 is positioned such that, the seam between the first FOV and the second FOV is located in the peripheral region of the tiled FOV. For example, the seam may be located at least 35 degrees off center. In some embodiments, center is a direction that corresponds to a gaze direction of an eye of a user of the headset looking straight ahead. Note that locating the region 145 such that the seam is located in the peripheral region of the tiled FOV mitigates chances of a user seeing it (as it would generally be outside a foveal region of user's gaze). The display assemblies are discussed in detail below with regard to FIGS. 1B, 2A, and 2B. Note that the discussion herein is in the context of a single display block 110, however, there may be display blocks for each eye of the headset 100.

In some embodiments (e.g., AR and/or MR), some or all of the display block 110 is at least partially transparent to visible light. In these embodiments, light from a local area in front of the headset 100 may pass through one or both of the display assemblies 130,140 to an eye of the user.

The DCA 120 determines depth information for objects in a local area around the headset 100. The DCA 120 is discussed in detail below with regard to FIGS. 2 and 8. Note that while the DCA 120 is shown in a particular location on the headset 100, in other embodiments, the DCA 120 may be located elsewhere on the headset 100 and/or may include additional cameras.

Figure 1B:
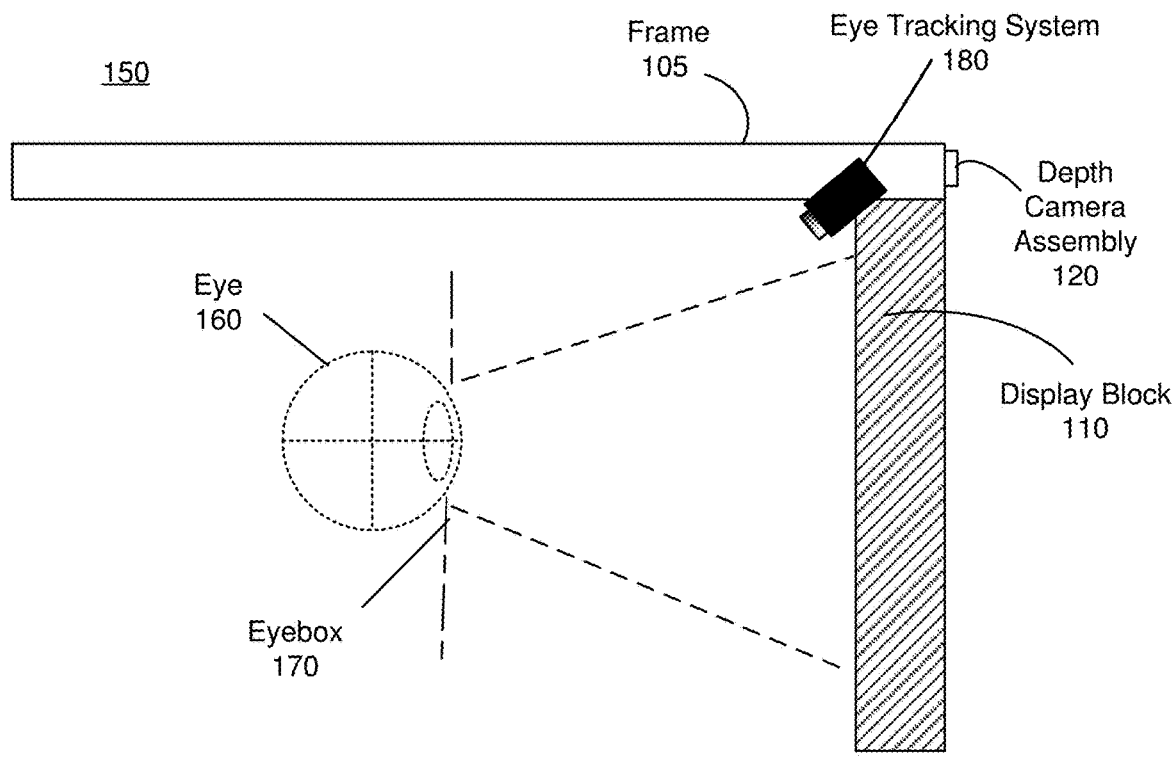
FIG. 1B is a cross-section of the headset illustrated in FIG. 1A, in accordance with one or more embodiments.

FIG. 1B is a cross-section 150 of the headset 100 illustrated in FIG. 1A, in accordance with one or more embodiments. The display block 110 presents content (i.e., image light) to an eye 160 in an eyebox 170. The eyebox 170 is a location where the eye 160 is positioned when the user wears the headset 100. For purposes of illustration, FIG. 1B shows the cross section 150 associated with a single eye 160 and the display block 110, but in alternative embodiments not shown, another display block which is separate from the display block 110 shown in FIG. 1B, provides image light to an eyebox of another eye of the user. In some embodiments, the headset 100 includes an eye tracking system 180. Additionally, in other embodiments, the eye tracking system 180 may be positioned on the headset 100 in locations different from those shown in FIG. 1B.

The eye tracking system 180 is configured to determine eye tracking information for the eye 160. The determined eye tracking information may comprise information about an orientation of the eye 160 in the eyebox 170, e.g., information about an angle of an eye-gaze. The eye tracking system 180 may be any eye tracking system known by one skilled in the art. The eye tracking system 180 includes one or more projectors and one or more cameras. The one or more projectors illuminates the eye with infrared (IR) light, e.g., an infrared flash (e.g., used for time-of flight depth determination), structured light pattern, a glint pattern, etc. The one or more cameras captures images of the 160 illuminated with the IR light from the projector, and the eye tracking system 180 determines depth information using the captured images and a depth determination technique. Depth determination techniques may include, e.g., structured light, time-of-flight, stereo imaging, some other depth determination methodology familiar to one skilled in the art, etc.

The eye tracking system 180 generates eye tracking information of the eye 250 based on the depth information. Eye tracking information includes, e.g., movement information, position and orientation, gaze direction (e.g., where a user is looking), vergence, etc. In some embodiments, the eye tracking system 180 provides the generated eye tracking information to the display block 110. The display block 110 may utilize the eye tracking information (e.g., gaze direction) to dynamically adjust brightness of portions of a tiled FOV to mitigate visibility of a seam within the tiled FOV.

Figure 2:
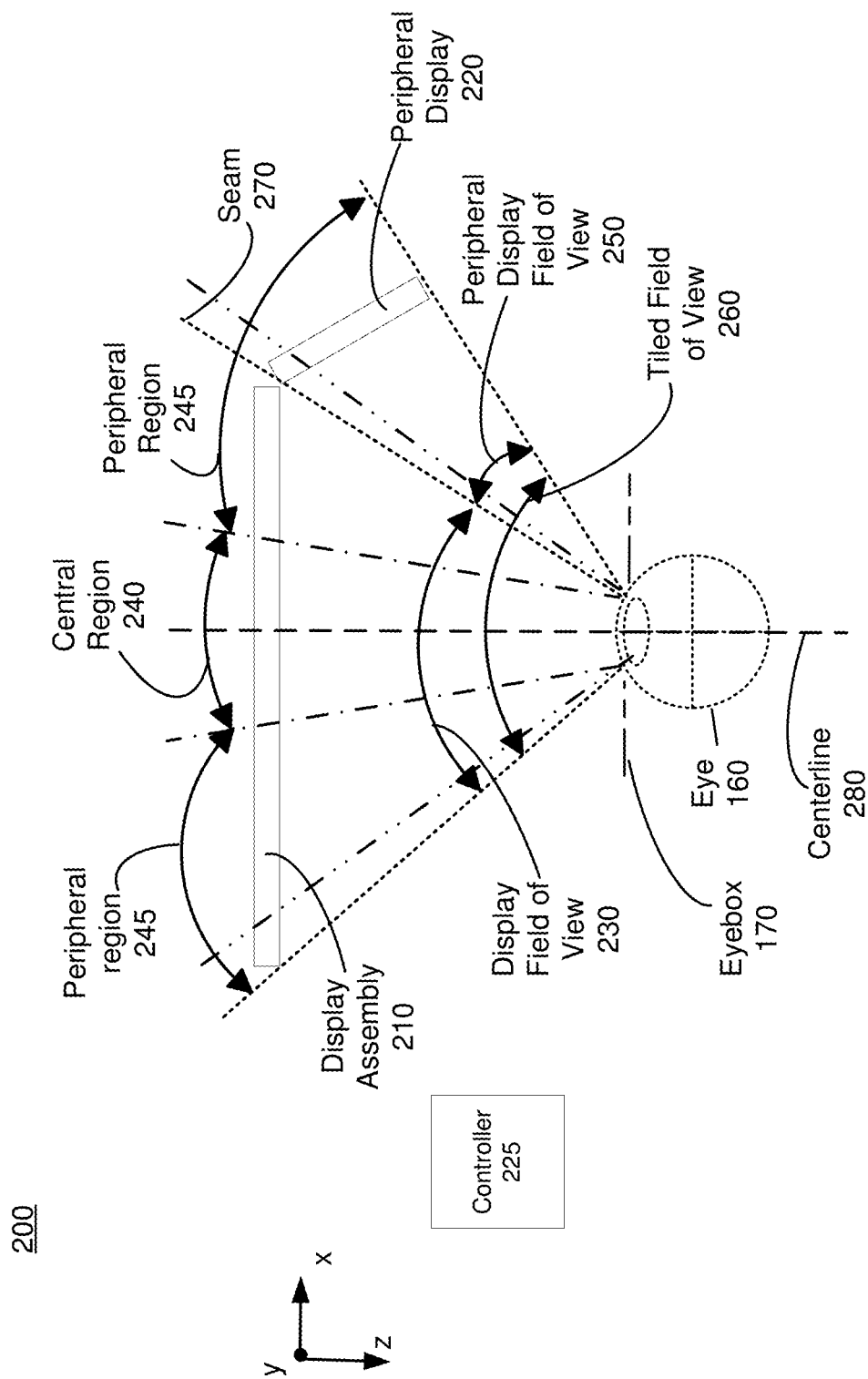
FIG. 2 is an example display block, in accordance with one or more embodiments.

FIG. 2 is an example display block 200, in accordance with one or more embodiments. The display block 200 provides content to the eyebox 170. The display block 200 is an embodiment of the display block 110. The display block 200 may be incorporated into a headset (e.g., the headset 100), a HMD, some other device, or some combination thereof. The display block 200 includes a display assembly 210, a peripheral display assembly 220, and a controller 225. The display assembly 130 is an embodiment of the display assembly 210 and the display assembly 140 is an embodiment of the peripheral display assembly 220.

The display assembly 210 emits a first portion of image light over a display FOV 230. The display FOV 230 includes a central region 240 that corresponds to a region in front of a user which is likely to include a gaze location (i.e., a foveal FOV of the eye 160) of the user. The display assembly 210 is positioned to be a display whose display FOV 230 generally corresponds to gaze locations in front of a user (e.g., user is looking straight ahead). The display assembly 210 may be a waveguide display (e.g., discussed in detail below with regard to FIG. 3), an electronic display (e.g., discussed in detail below with regard to FIG. 4), a projector display (e.g., as discussed in detail below with regard to FIG. 5), or some combination thereof. Additionally, while the display assembly 210 is flat as illustrated, in alternate embodiments, the display assembly 210 may be curved. The curvature may be in one (e.g., x or y) or two dimensions (e.g., x and y).

The peripheral display assembly 220 emits a second portion of the image light over a peripheral display FOV 250. The peripheral display FOV 250 is smaller than the main display FOV 230. The peripheral display assembly 220 is positioned to be a peripheral display whose peripheral display FOV 250 generally corresponds to gaze locations towards a temple of the user (e.g., to a user's right). The peripheral display assembly 220 may be a waveguide display (e.g., discussed in detail below with regard to FIG. 3) an electronic display (e.g., discussed in detail below with regard to FIG. 4), a projector display (e.g., as discussed in detail below with regard to FIG. 5), or some combination thereof. Note in some embodiments, some or all of the second portion of the image light emitted by the peripheral display assembly 220 is at a lower resolution than at least some of the first portion of the image light emitted by the display assembly 210. Additionally, while the peripheral display assembly 220 is flat as illustrated, in alternate embodiments, the peripheral display assembly 220 may be curved. The curvature may be in one or two dimensions.

The display FOV 230 and the peripheral display FOV 250 create a tiled FOV 260 from the perspective of the eyebox 170. The tiled FOV 260 can be broken into the central region 240 and a peripheral region 245. Note a person generally looks forward, and often will turn their head in a particular direction to look at an object instead of merely moving their eyes to look at the object. Accordingly, the central region 240 corresponds to a region in front of a user which is likely to include a gaze location (i.e., a foveal FOV of the eye 160) of the user. The central region 240 may, for example, span 60 degrees (i.e., 30 degrees on either side of a centerline 280). In other embodiments, the central region 240 may be larger or smaller. Note that the central region 240 may have a different angular spread for different dimensions or it may be circularly symmetric about the centerline 280. A region outside of the target FOV 240 is referred to as a peripheral region 245. As the target FOV 240 is a region that is likely to include a foveal FOV of the eye 160, the peripheral region 245 corresponds to a region that is generally viewed by non-foveal region of the eye that has lower density of cones 160 (i.e., peripheral vision).

A portion of the display assembly 210 and the peripheral display assembly 220 abut each other. And together the display FOV 230 and the peripheral display FOV 250 create the tiled FOV 260 from the perspective of the eyebox 170. Note that the abutting of the display assembly 210 and the peripheral display assembly 220 causes a seam 270 in the tiled FOV 260. A location of the abutment is positioned such that the seam 270 is located within the peripheral region 245 of the tiled FOV 260. Accordingly, it is likely that the seam 270 generally would fall on a low resolution portion (non-foveal region) of a retina of the eye 160. In some embodiments, the seam 270 is located at least 35 degrees off center (i.e., an angle between the centerline 280 and the seam 270 is at least 35 degrees). The centerline 280 is a direction that corresponds to a gaze direction of the eye 270 looking straight ahead. In some embodiments, the centerline 280 is positioned such that it passes through a central point of the center region 240.

The controller 225 controls the display assembly 210 and the peripheral display assembly 220. The controller 225 provides instructions that control how content is rendered for the display assembly 210 and the peripheral display assembly 220. Note that the controller 225 is communicatively coupled to both the display assembly 210 and the peripheral display assembly 220, and that the couplings have been omitted from the figure for ease of illustration. Some or all of the controller may be part of the display assembly 210, the peripheral display assembly 220, or both the display assembly 210 and the peripheral display assembly 220. In alternate embodiments, the display assembly 210 is coupled to a controller and the peripheral display assembly 220 is coupled to a separate controller.

Locating the region of abutment such that the seam 270 is outside of the central region 240 mitigates chances of the eye 270 seeing it (as it would be outside a foveal region of user's gaze). However, the seam 270 may still be within a field of view of the eye 160, and in some cases, the eye 160 may change its gaze location such that a foveal region of the eye 160 would include the seam 270. To help offset visibility of the seam 270, in some embodiments, the controller 225 instructs at least one of the peripheral display assembly 220 and/or the display assembly 210 to adjust brightness of emitted image light. For example, the controller 225 may instruct one or both of the peripheral display assembly 220 and the display assembly 210 to adjust brightness of emitted image light that correspond to portions of the seam 270 and/or image light surrounding the seam 270. The adjusted brightness is such that a brightness of a portion of the image light in the display FOV 230 adjacent to the seam 270, a brightness of a portion of the image light in peripheral display FOV 250 adjacent to the seam 270, and a brightness of the seam 270 are all within a threshold value of each other (e.g., all within 20% of each other). In some instances, the threshold value is such that brightness, as viewed from the eyebox 170, appears to be substantially uniform across the seam 270 and the portions of the display FOV 230 and the peripheral display FOV 250 that are adjacent to the seam 270.

In some embodiments, the controller 225 may use eye tracking information from an eye tracking system (e.g., the eye tracking system 180) to dynamically control brightness of some or all of one and/or both of the peripheral display assembly 220 and/or the display assembly 210. For example, if a gaze location of the eye 160 is within a threshold distance (e.g., a distance corresponding to 2 degrees of FOV) of the seam 270, the controller 225 may instruct one or both of the peripheral display assembly 220 and the display assembly 210 to adjust brightness of emitted image light that corresponds to some or all of portions of the seam 270 and/or some or all of the portions of the image light surrounding the seam 270 such that they have a brightness value within a threshold value of each other (e.g., as discussed above).

Note in some embodiments one or both of the display assembly 210 and the peripheral display assembly 220 are waveguide displays. As described in detail below with regard to FIG. 3, a waveguide display includes a waveguide. A side (also referred to as an edge) of the waveguide that abuts an adjacent display assembly (i.e., a seam location) can be cut at specific angles to help mitigate visibility of the seam. For example, the side may be cut such that it forms a right angle with the front (i.e., side facing toward the eyebox 170. In some embodiments, the side (i.e., a seam side) of the waveguide may be cut such that it is parallel to the seam 270. Moreover, in the case of that the waveguide is adjacent (but not touching) to another waveguide, a seam side of the other waveguide may also be cut to parallel the seam. In some embodiments, both of the cut seam sides may have a light absorption coating (e.g., blackened).

Note, while there is no overlap in the display FOV 230 and the peripheral display FOV 250, in some embodiments, there is overlap between the display FOV 230 and the peripheral display FOV 250. For example, the display FOV 230 may be −30 degrees to +30 degrees, and the peripheral display FOV 250 may be 20 degrees to 60 degrees. In some embodiments, there is no overlap between the display FOV 230 and the peripheral display FOV 250, but there is a spatial overlap of at least a portion of the display assembly 210 with at least a portion of the peripheral display 220 to form an area of overlap. In some embodiments, the area of overlap for the portions of the display assembly 210 and the peripheral display 220 would include the seam 270. The area of overlap may help to maintain a size of the eyebox 170 (as it may otherwise reduce in size for certain angles). For example, the portion of the peripheral display 220 would be positioned behind the portion of the display assembly 210 in the area of overlap.

Figure 3:
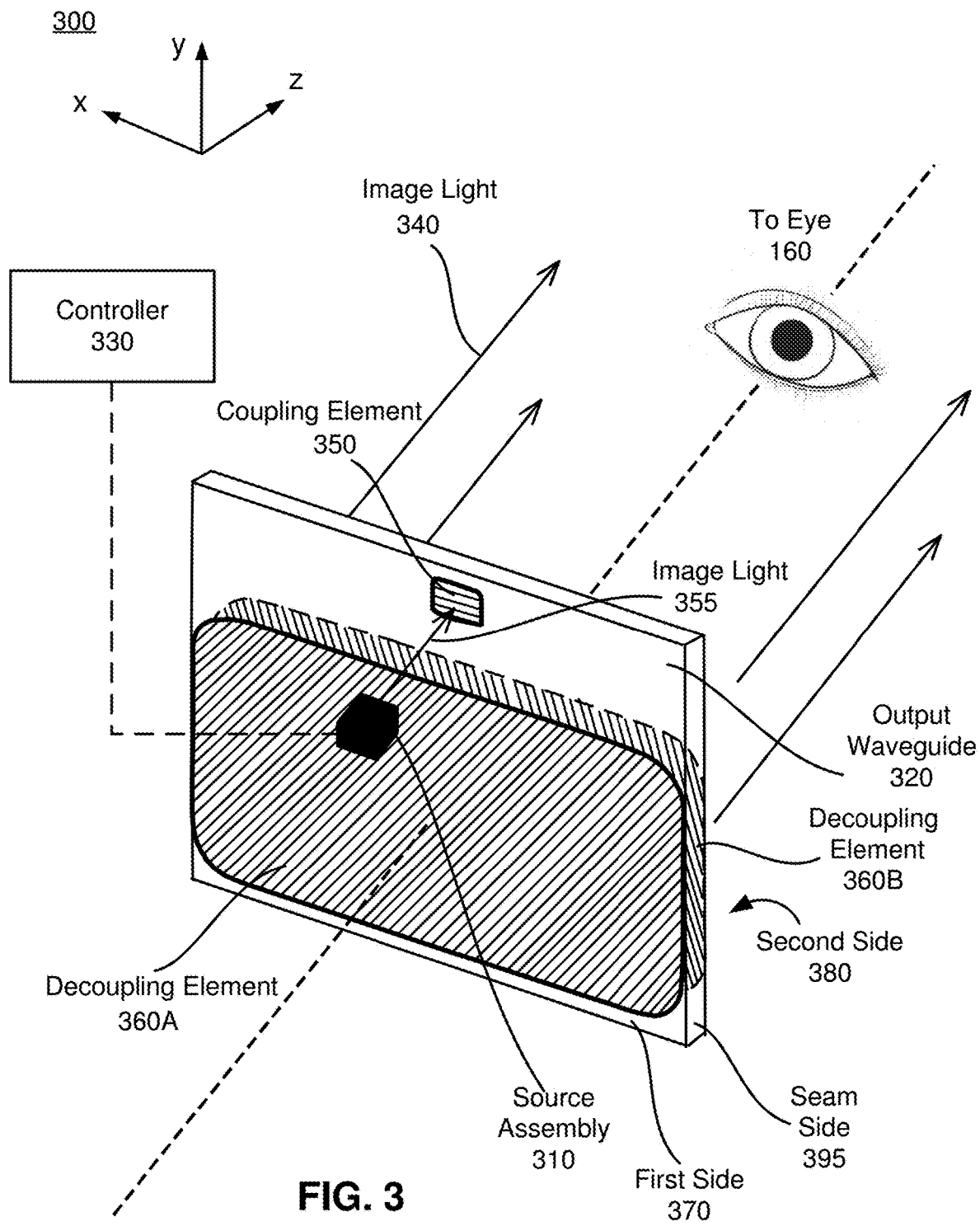
FIG. 3 illustrates an isometric view of a waveguide display, in accordance with one or more embodiments.

FIG. 3 illustrates an isometric view of a waveguide display 300, in accordance with one or more embodiments. The display assembly 210 may be a waveguide display 300, the peripheral display assembly 220 may be a waveguide display 300, or both the display assembly 210 and the peripheral display assembly 220 may be waveguide displays 300. Note that additional detail regarding waveguide displays may be found in U.S. application Ser. No. 15/704,190, which is incorporated by reference in its entirety.

The waveguide display 300 includes a source assembly 310, an output waveguide 320, and a controller 330. For purposes of illustration, FIG. 3 shows the waveguide display 300 associated with a single eye 160, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 generates and outputs image light 355 to a coupling element 350 located on a first side 370 of the output waveguide 320. The source assembly 310 includes a source and an optics system. In some embodiments, the source is a single source or a strip source that is scanned to form image light. In other embodiments, the source emits a 2-dimensional image as image light. The source may be, e.g., laser diode, a vertical cavity surface emitting laser, a light emitting diode, a tunable laser, a MicroLED, a superluminous LED (SLED), a liquid crystal display (LCD), an organic light emitting diode (OLED) display, an active-matrix organic light-emitting diode display (AMOLED), a micro-display, some light source that emits coherent or partially coherent light, or some combination thereof. The source emits light in a visible band (e.g., from about 390 nm to 700 nm), and it may emit light that is continuous or pulsed. The source emits light in accordance with one or more illumination parameters received from the controller 330. An illumination parameter is an instruction used by the source to generate light. An illumination parameter may include, e.g., restriction of input wave vector for total internal reflection, restriction of input wave vector for maximum angle, source wavelength, pulse rate, pulse amplitude, beam type (continuous or pulsed), other parameter(s) that affect the emitted light, or some combination thereof.

The optics system includes one or more optical components that condition the light from the source. Conditioning light from the source may include, e.g., expanding, collimating, scanning, adjusting orientation in accordance with instructions from the controller 330, some other adjustment of the light, or some combination thereof. The one or more optical components may include, e.g., lenses, scanning mirrors, micro-electro-mechanical systems (MEMS) scanning mirrors, liquid lens, apertures, gratings, or some combination thereof. Light emitted from the optics system (and also the source assembly 310) is referred to as image light

355. The optics system outputs the image light 355 at a particular orientation (in accordance with the display instructions) toward the output waveguide 320.

Note that while FIG. 3 illustrates a single source assembly 310, in other embodiments, there may be a plurality of source assemblies. Moreover, in some embodiments, light from a single source assembly 310 may be coupled into multiple output waveguides (and more generally used in different display assemblies).

The output waveguide 320 is an optical waveguide that outputs image light to an eye 220 of a user. The output waveguide 320 receives the image light 355 at one or more coupling elements 350 located on the first side 370, and guides the received input image light to decoupling element 360A. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, an array of holographic reflectors, or some combination thereof. In some configurations, each of the coupling elements 350 have substantially the same area along the X-axis and the Y-axis dimension, and are separated by a distance along the Z-axis (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The coupling element 350 has a first grating vector. The pitch of the coupling element 350 may be 300-600 nm.

The decoupling element 360A redirects the total internally reflected image light from the output waveguide 320 such that it may be decoupled via the decoupling element 360B. The decoupling element 360A is part of, or affixed to, the first side 370 of the output waveguide 320. The decoupling element 360B is part of, or affixed to, the second side 380 of the output waveguide 320, such that the decoupling element 360A is opposed to the decoupling element 360B. Opposed elements are opposite to each other on a waveguide. In some configurations, there may be an offset between the opposed elements. For example, the offset can be one quarter of the length of an opposed element. The decoupling elements 360A and 360B may be, e.g., a diffraction grating, or a holographic grating, one or more cascaded reflectors, one or more prismatic surface elements, an array of holographic reflectors. In some configurations, each of the decoupling elements 360A have substantially the same area along the X-axis and the Y-axis dimension, and are separated by a distance along the Z-axis (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The decoupling element 360A has an associated second grating vector, and the decoupling element 360B has an associated third grating vector. An orientation and position of the image light exiting from the output waveguide 320 is controlled by changing an orientation and position of the image light 355 entering the coupling element 350. The pitch of the decoupling element 360A and/or the decoupling element 360B may be 300-600 nm. In some configurations, the coupling element 350 couples the image light into the output waveguide 320 and the image light propagates along one dimension. The decoupling element 360A receives image light from the coupling element 350 covering a first portion of the first angular range emitted by the source assembly 310 and diffracts the received image light to another dimension. Note that the received image light is expanded in 2D until this state. The decoupling element 360B diffracts a 2-D expanded image light toward the eyebox. In alternate configurations, the coupling element 350 couples the image light into the output waveguide 320 and the image light propagates along one dimension. The decoupling element 360B receives image light from the coupling element 350 covering a first portion of the first angular range emitted by the source assembly 310 and diffracts the received image light to another dimension. The decoupling element 360A diffracts the image light toward the eyebox.

The coupling element 350, the decoupling element 360A, and the decoupling element 360B are designed such that a sum of their respective grating vectors is less than a threshold value, and the threshold value is close to or equal to zero. Accordingly, the image light 355 entering the output waveguide 320 is propagating in the same direction when it is output as image light 340 from the output waveguide 320. Moreover, in alternate embodiments, additional coupling elements and/or de-coupling elements may be added. And so long as the sum of their respective grating vectors is less than the threshold value, the image light 355 and the image light 340 propagate in the same direction. The location of the coupling element 350 relative to the decoupling element 360A and the decoupling element 360B as shown in FIG. 3 is only an example. In other configurations, the location could be on any other portion of the output waveguide 320 (e.g. a top edge of the first side 370, a bottom edge of the first side 370). In some embodiments, the waveguide display 300 includes a plurality of source assemblies 310 and/or a plurality of coupling elements 350 to increase the FOV and/or eyebox further.

The output waveguide 320 includes a waveguide body with the first side 370 and a second side 380 that are opposite to each other. In the example of FIG. 3, the waveguide body includes the two opposite sides—the first side 370 and the second side 380, each of the opposite sides representing a plane along the X-dimension and Y-dimension. The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.3-1 mm thick along Z-dimension.

The output waveguide 320 also include a seam side 395. The seam side 395 is a side of the output waveguide 320 that abuts at least one other display assembly. As discussed above with regard to FIG. 2 and below with regard to FIG. 6B, the seam side 395 can be can to a specific angle to help mitigate visibility of a seam over a tiled FOV. In some embodiments, a portion of the output waveguide 320 along the seam is cut at a right angle. For example, as shown in FIG. 3 the seam side 395 forms a right angle with the second side 380. In some embodiments, the seam side 395 may be cut such that it is parallel to a seam (e.g., the seam 270). Moreover, in the case of that the output waveguide 320 is adjacent (but not touching) an adjacent output waveguide, a seam side of the adjacent output waveguide may also be cut to parallel the seam. In some embodiments, both of the cut seam sides may have a light absorption coating (e.g., blackened).

The controller 330 controls operation of the source assembly 310. The controller 330 is an embodiment of the controller 225. The controller 330 determines display instructions for the source assembly 310. The display instructions are generated based at least on the one or more display instructions generated by the controller 330. Display instructions are instructions to render one or more images. In some embodiments, display instructions may simply be an image file (e.g., bitmap). The display instructions may be received from, e.g., a console of a system (e.g., as described below in conjunction with FIG. 8). Display instructions are instructions used by the source assembly 310 to generate image light 340. The display instructions may include, e.g., a type of a source of image light (e.g. monochromatic, polychromatic), a scanning rate, an orientation of a scanning apparatus, one or more illumination parameters, or some combination thereof.

The display instructions may also selectively adjust brightness of particular regions of the image light 340 (e.g., to mitigate visibility in a seam in a tiled FOV). The controller 330 includes a combination of hardware, software, and/or firmware not shown here so as not to obscure other aspects of the disclosure.

In alternate configurations (not shown), the output waveguide 320 includes the coupling element 350 on the first side 370 and a second coupling element (not shown here) on the second side 380. The coupling element 350 receives an image light 355 from the source assembly 310. The coupling element on the second side 380 receives an image light from the source assembly 310 and/or a different source assembly. The controller 330 determines the display instructions for the source assembly 310 based at least on the one or more display instructions.

In alternate configurations, the output waveguide 320 may be oriented such that the source assembly 310 generates the image light 355 propagating along an input wave vector in the Z-dimension. The output waveguide 320 outputs the image light 340 propagating along an output wave vector that matches the input wave vector. In some configurations, the image light 340 is a monochromatic image light that can be projected on multiple planes (e.g. multi-planar monochromatic display). In alternate configurations, the image light 340 is a polychromatic image light that can be projected on multiple planes (e.g. multi-planar polychromatic display).

In some embodiments, the output waveguide 320 outputs the expanded image light 340 to the user's eye 220 with a very large FOV. For example, the expanded image light 340 provided to the user's eye 220 with a diagonal FOV (in x and y) of at least 60 degrees. The output waveguide 320 is configured to provide an eyebox of with a length of at least 20 mm and a width of at least 10 mm. Generally, the horizontal FOV is larger than the vertical FOV. If the aspect ratio is 16:9, the product of the horizontal FOV and the vertical FOV will be ~52×30 degrees whose diagonal FOV is 60 degrees for instance.

Figure 4:
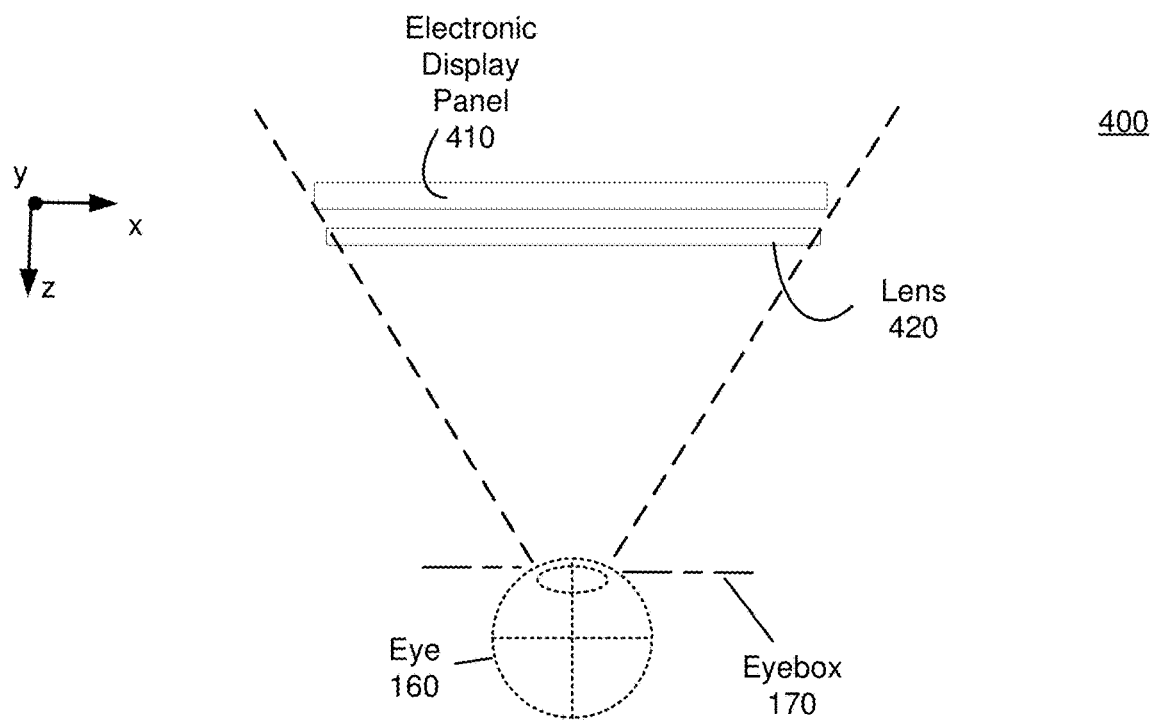
FIG. 4 is an example electronic display, in accordance with one or more embodiments.

FIG. 4 is an example electronic display 400, in accordance with one or more embodiments. The display assembly 210 may be an electronic display 400, the peripheral display assembly 220 may be an electronic display 400, or both the display assembly 210 and the peripheral display assembly 220 may be electronic displays 400. The electronic display 400 includes an electronic display panel 410 and a lens 420. For purposes of illustration, FIG. 4 shows the electronic display 400 associated with a single eye 160, but in some embodiments, another electronic display separate (or partially separate) from the electronic display 400, provides image light to another eye of the user. In a partially separate system, one or more components may be shared between electronic displays for each eye.

The electronic display panel 410 generates image light using a two-dimensional array of pixels. An electronic display panel 410 may be, e.g., a liquid crystal display (LCD), an organic light emitting diode (OLED) display, an active-matrix organic light-emitting diode display (AMOLED), a transparent OLED (TOLED), some other 2-D array of pixels, or some combination thereof. A TOLED may be used in augmented/mixed reality applications.

The lens 420 directs light the image light emitted by the electronic display panel 410 to the eyebox 170. In some embodiments, the lens 420 magnifies received image light from the electronic display panel 410, corrects optical errors associated with the image light, and presents the corrected image light to the eyebox 170. In some embodiments, a gap (~several mm) is between the lens 420 and the electronic display panel 410. In alternate embodiments, the lens 420 may be directly affixed to the electronic display panel 410.

In the illustrated embodiments, the lens 420 is a single optical element. In other embodiments, the lens 420 includes one or more optical elements and/or combinations of different optical elements. For example, an optical element is an aperture, a meniscus lens, a Fresnel lens, a convex lens, a concave lens, a filter, or any other suitable optical element that affects the image light emitted from the electronic display panel 410.

Magnification of the image light by the lens 420 allows the electronic display panel 410 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases, all of the user's field of view. In some embodiments, the lens 420 is designed to correct one or more types of optical errors (e.g., barrel distortion, pincushion distortion, longitudinal chromatic aberration, transverse chromatic aberration, spherical aberration, comatic aberration, field curvature, astigmatism, etc.).

Figure 5:
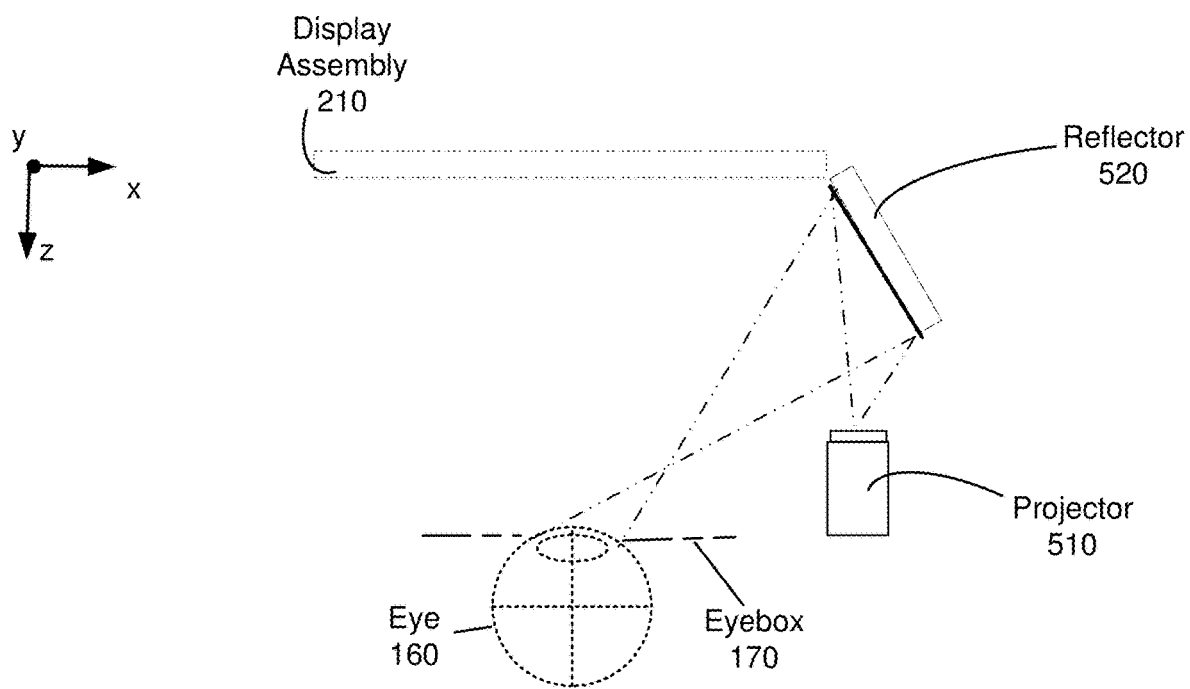
FIG. 5 is an example projector display, in accordance with one or more embodiments.

FIG. 5 is an example projector display 500, in accordance with one or more embodiments. In the illustrated embodiment, the projector display 500 is configured to function as a peripheral display 220. However, more generally, the display assembly 210 may be a projector display 500, the peripheral display assembly 220 may be projector display 500, or both the display assembly 210 and the peripheral display assembly 220 may be projector displays 500. The projector display 500 includes a projector 510 and a reflector 520. For purposes of illustration, FIG. 5 shows the projector display 500 associated with a single eye 160, but in some embodiments, another projector display separate (or partially separate) from the projector display 500, provides image light to another eye of the user. In a partially separate system, one or more components may be shared between projector displays for each eye.

The projector 510 generates image light. The projector 510 generates a 2D image and projects the generated 2D image onto the reflector 520. The projector 510 includes a source and an optical assembly. The source emits light. The source emits light in a visible band (e.g., from about 390 nm to 700 nm), and it may emit light that is continuous or pulsed. The source emits light in accordance with one or more illumination parameters received from the controller 225.

In some embodiments, the source is a liquid crystal display (LCD), an organic light emitting diode (OLED)

display, an active-matrix organic light-emitting diode display (AMOLED), a micro-display, or some other display that emits a 2D image. Alternatively, the source is a single light source, or includes one or more strip sources that emit light which is scanned to form the image light.

For example, the projector 510 may include an emitter or array of emitters arranged as a strip source. A strip source is a rectangular array of light emitters. A light emitter is a device that emits light. A light emitter may be, e.g., a light emitting diode (LED), a microLED, a tunable laser, a VCSEL, a laser diode, some other device that emits light, or some combination thereof. A strip source may be a 1-dimensional array (e.g., 1×1000 pixels) or a 2D array (e.g., 10×1000 pixels). In some embodiments, the light source is monochromatic. In other embodiments, the light source is polychromatic. For example, in some embodiments, a strip source in the light source may include sub-pixels of different colors (e.g., red, green, and blue). The light source 12 emits in one or more bands of light. The bands of light may include, e.g., visible light and/or infrared light. The projector 510 may include a mirror assembly that scans out the image light.

The optical assembly projects the generated image light onto the reflector 520. The optical assembly may include one or more lenses that condition the image light. Conditioning the image light may include, e.g., collimating, expanding, correcting aberration, etc.

The reflector 520 reflects the image light received from the projector 510 toward the eyebox 170. The reflector 520 includes a reflective material that reflects light in the visible band. The reflective material may be, e.g., polished aluminum, polished silver, etc. In some embodiments, the reflective material may be partially transmissive (e.g., for augmented/mixed reality applications). In some embodiments, the reflective material is a coating on a substrate (e.g., plastic, glass, etc.). While not shown, in some embodiments, the reflector 520 may be curved. The curvature may be in one axis, two axes, or be freeform.

Figure 6A:
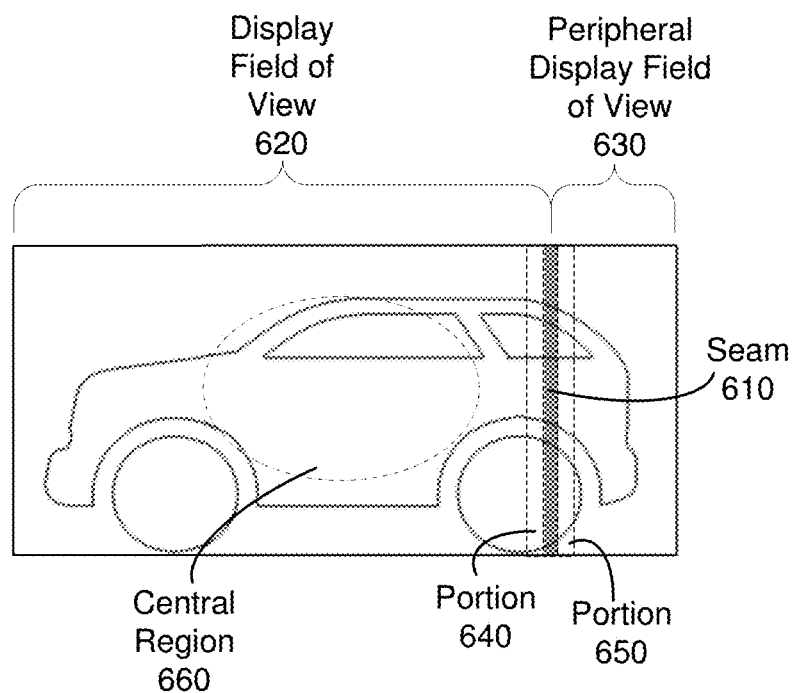
FIG. 6A is an example of a tiled FOV with a visible seam, in accordance with one or more embodiments.

FIG. 6A is an example of tiled FOV 600 with a visible seam 610, according to one or more embodiments. The tiled FOV 600 is composed of image light presented over a display FOV 620 (e.g., emitted from the display assembly 210) and a peripheral display FOV 630 (e.g., emitted from the peripheral display assembly 220) that are tiled together. Note, while there is no overlap in the display FOV 620 and the peripheral display FOV 630, in some embodiments, there is overlap between the display FOV 620 and the peripheral display FOV 630. In FIG. 6A, the seam 610 appears as a darkening of the image relative to one or both portions 640, 650 of the image that are adjacent to the seam 610. Note that a width of the seam in FIG. 6A is exaggerated for illustration, and in practice the seam 610 is relatively narrow (e.g., on the order of a several pixels).

Note that a central region 660 of the tiled FOV 600 does not include the seam 610. The central region 660 is an embodiment of the central region 240 and corresponds to a region in front of a user which is likely to include a gaze location. Placing the seam 610 outside of the central region 660 mitigates chances of the user seeing it (as it would be outside a foveal region of user's gaze). However, the seam 610 may still be within a peripheral field of view of the user, and in some cases, the user may change his/her gaze location such that a foveal region of the eye would include the seam 610. For example, as a user looks to the right of the tiled image light 600 the seam 610 may fall into a foveal field of view of the eye.

Figure 6B:
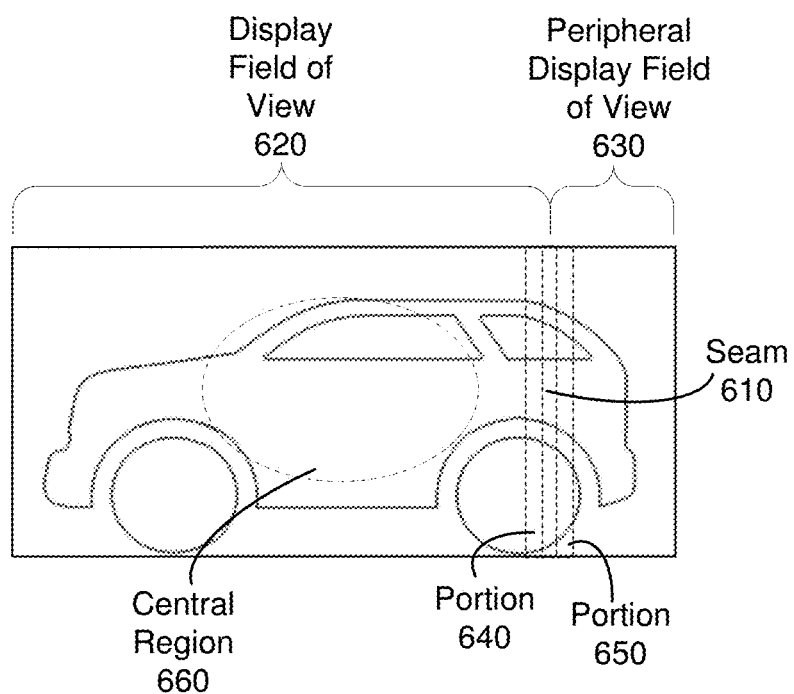
FIG. 6B is an example of mitigating the seam in the tiled FOV of FIG. 6A, in accordance with one or more embodiments.

FIG. 6B is an example of mitigating the seam 610 in the tiled FOV 600 of FIG. 6A, according to one or more embodiments. Visibility of the seam 610 is done by reducing differences in brightness between the seam 610 and the portions 640, 650 of the tiled FOV 600 that are adjacent to the seam 610.

In some embodiments, a controller (e.g., the controller 225) instructs one or both of a peripheral display assembly (e.g., the peripheral display assembly 220) and a display assembly (display assembly 210) to adjust brightness of emitted image light at the seam 610. For example, the controller may instruct one or both of the peripheral display assembly 220 and/or the display assembly 210 to adjust brightness of emitted image light that correspond to portions of the seam 610 and/or image light surrounding the seam 610 (e.g., in portions 640 and 650). The adjusted brightness is such that a brightness of the portion 640 of the tiled FOV 600 in the display FOV 620, a brightness of the portion 650 of the tiled FOV 600 in peripheral display FOV 630, and a brightness of the seam 610 are all within a threshold value of each other (e.g., all within 20% of each other). In some instances, the threshold value is such that brightness, as viewed from the eyebox 170, appears to be substantially uniform across the seam 610 and the adjacent portions 640, 650 of the tiled image light.

In some embodiments, the controller may use eye tracking information from an eye tracking system (e.g., the eye tracking system 180) to dynamically control brightness of some or all of one and/or both of the peripheral display FOV 630 and/or the display FOV 620. For example, if a gaze location of the eye is within a threshold distance (e.g., a distance corresponding to 2 degrees of FOV) of the seam 610 the controller may adjust instruct one or both of the peripheral display assembly and the display assembly to adjust brightness of emitted image light that correspond to some or all of the seam 610, some or all of the portion 640 of image light, some or all of the portion 650 of image light, or some combination thereof, such that they all have a brightness value within a threshold value of each other (and in some embodiments appear substantially uniform).

In some embodiments one or both of the display assembly and the peripheral display assembly are waveguide displays. A side (also referred to as an edge) of the waveguide that abuts an adjacent display assembly (i.e., a seam location) is cut at specific angles to help mitigate visibility of the seam.

Figure 7:
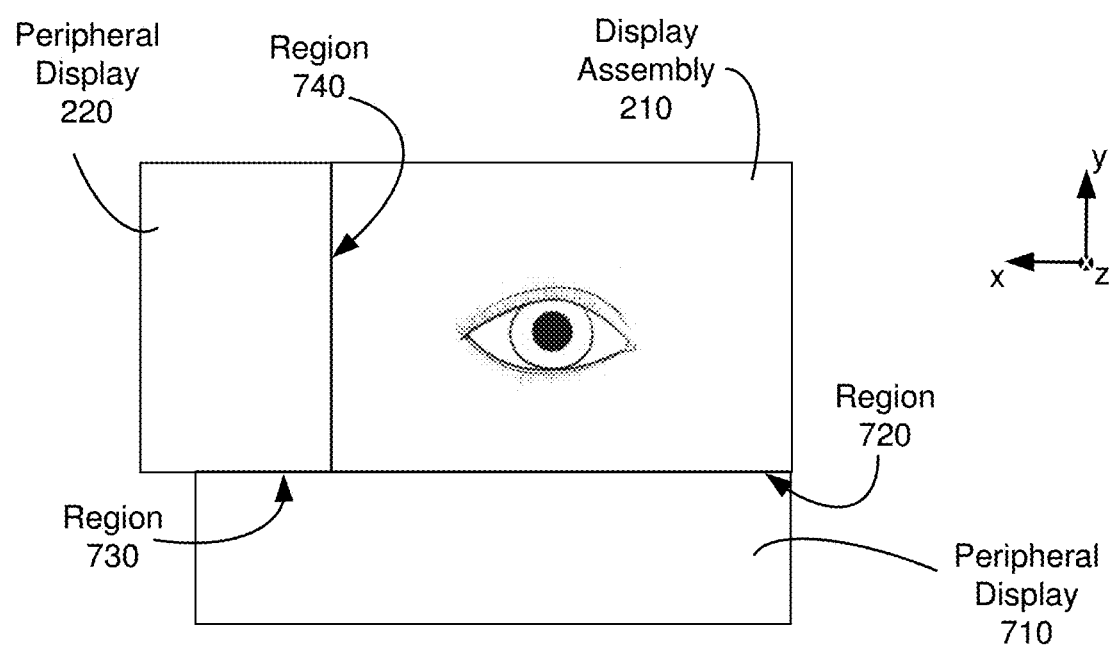
FIG. 7 is front view of an example display block that includes three display assemblies, in accordance with one or more embodiments.

FIG. 7 is front view of an example display block 700 that includes three display assemblies, in accordance with one or more embodiments. The display block 700 provides content to the eyebox 170. The display block 700 is an embodiment of the display block 110. The display block 700 may be incorporated into a headset (e.g., the headset 100), a HMD, some other device, or some combination thereof. The display block 700 is substantially similar to the display block 200 except that it also includes an additional peripheral display 710.

The display block 700 presents content over a tiled FOV to an eyebox. In the illustrated embodiment, the peripheral display 710 abuts the display assembly 210 over a region 720 and abuts the peripheral display 220 over a region 730. And each of the regions can result in an additional seam in the tiled FOV. The additional seams can be mitigated using the techniques described above with regard to FIGS. 2 and 6B. Note that while the display block 700 illustrates three display assemblies and the display block 200 illustrates two display assemblies, in other embodiments, there may be additional display assemblies that are tiled together. Moreover, the locations and/or sizes of the display assemblies may be different.

Figure 8:
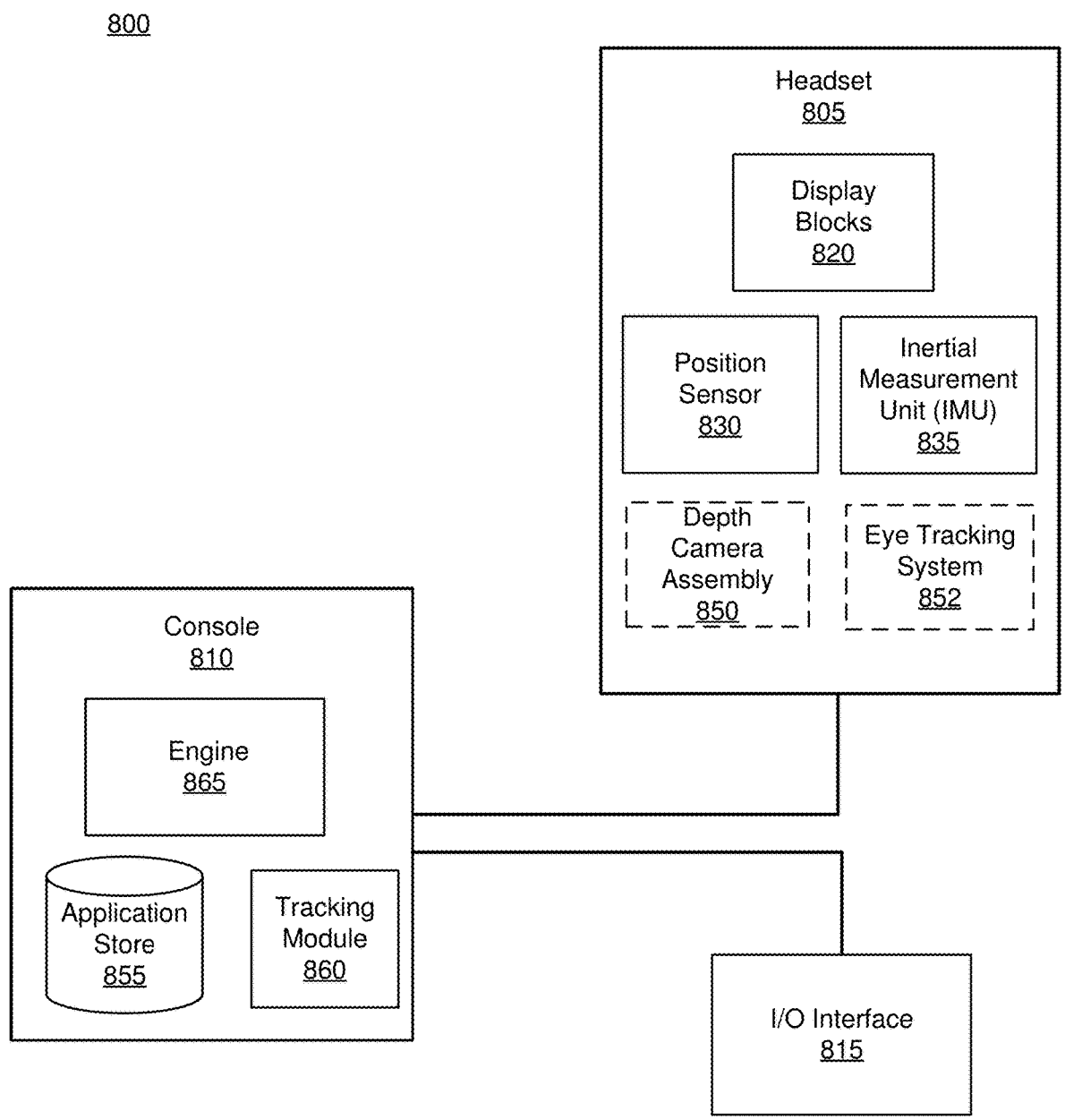
FIG. 8 is a block diagram of an example artificial reality system, in accordance with one or more embodiments.

FIG. 8 is a block diagram of an artificial reality system 800, according to one or more embodiments. The system 800 may operate in e.g., a VR system environment, an AR system environment, a MR system environment, or some combination thereof. The system 800 shown by FIG. 8 comprises a headset 805, a console 810, and an input/output (I/O) interface 815. While FIG. 8 shows an example system 800 including one headset 805 and on I/O interface 815, in other embodiments any number of these components may be included in the system 800. For example, there may be multiple headsets 805 each having an associated I/O interface 815, with each headset 805 and I/O interface 815 communicating with the console 810. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the headset 805.

The headset 805 may be a HMD or a NED that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 805, the console 810, or both, and presents audio data based on the audio information. An embodiment of the headset 805 is the headset 100 described above in conjunction with FIGS. 1A and 1B.

The headset 805 includes a display block 820. The headset may also include one or more position sensors 830, an inertial measurement unit (IMU) 835, an optional depth camera assembly (DCA) 850, and an optional eye tracking system 852. Some embodiments of the headset 805 have different components than those described in conjunction with FIG. 8. Additionally, the functionality provided by various components described in conjunction with FIG. 8 may be differently distributed among the components of the headset 805 in other embodiments.

The display blocks 820 present content to the user. The display blocks 820 include, for each eye, a respective display block. A display block emits image light over a tiled FOV toward a corresponding eyebox. Each display block includes a plurality of display assemblies that are tiled together such each of the plurality of display assemblies emits a respective portion of the image light. A display assembly may be, e.g., a waveguide display, an electronic display, a projector display, or some other device that generates at least a portion of the image light, or some combination thereof. The plurality of display assemblies are positioned such that seams in the tiled FOV are positioned outside a central region of the tiled FOV. Additionally, visibility of the seams may be mitigated by, e.g., adjusting brightness of portions of the display assemblies based on eye tracking information from the eye tracking system 852, angle of cut of waveguides, etc.

The IMU 835 is an electronic device that generates data indicating a position of the headset 805 based on measurement signals received from one or more of the position sensors 830 and from the depth information received from the DCA 850. A position sensor 830 generates one or more measurement signals in response to motion of the headset 805. Examples of position sensor 830 include: one or more accelerometers, one or more gyroscopes, one or more magnetometers, another suitable type of sensor that detects motion, a type of sensor used for error correction of the IMU 835, or some combination thereof. The position sensors 830 may be located external to the IMU 835, internal to the IMU 835, or some combination thereof.

Based on the one or more measurement signals from one or more position sensors 830, the IMU 835 generates data indicating an estimated current position of the headset 805 relative to an initial position of the headset 805. For example, the position sensors 830 include multiple accelerometers to measure translational motion (forward/back, up/down, left/right) and multiple gyroscopes to measure rotational motion (e.g., pitch, yaw, roll). In some embodiments, the IMU 835 rapidly samples the measurement signals and calculates the estimated current position of the headset 805 from the sampled data. For example, the IMU 835 integrates the measurement signals received from the accelerometers over time to estimate a velocity vector and integrates the velocity vector over time to determine an estimated current position of a reference point on the headset 805. Alternatively, the IMU 835 provides the sampled measurement signals to the console 810, which interprets the data to reduce error. The reference point is a point that may be used to describe the position of the headset 805. The reference point may generally be defined as a point in space or a position related to the orientation and position of the headset 805.

In some embodiments, the headset 805 further includes the DCA 850. The DCA may be an embodiment of the DCA 120. The DCA 850 captures data describing depth information of the local area surrounding the headset 805. In embodiments not shown the DCA 850 is external to the headset 805 and captures images of the headset 805 within the local area. The DCA 850 uses one or more depth determination techniques to determine depth information. The depth determination techniques may include, e.g., structured light, stereo vision, time of flight, some other depth determination technique, or some combination thereof. The DCA 850 can compute the depth information using the data, or the DCA 850 can send this information to another device such as the console 810 that can determine the depth information using data from the DCA 850.

The eye tracking system 852 tracks the user's eye. For example, the eye tracking system 852 projects structured light to the eye and collect structured light reflected back from the eye to determine a position and/or orientation of the eye. The eye tracking system 852 can detect gaze directions of the eye. The detected gaze directions can be used, e.g., by display blocks 820, to dynamically adjust brightness of portions of one or more display assemblies to mitigate visibility of seams. The eye tracking system 852 is an embodiment of the eye tracking system 180.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 835 that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the headset 805 for processing in accordance with information received from one or more of: the DCA 850, the headset 805, and the I/O interface 815. In the example shown in FIG. 8, the console 810 includes an application store 855, a tracking module 860, and an engine 865. Some embodiments of the console 810 have different modules or components than those described in conjunction with FIG. 8. Similarly, the functions further described below may be distributed among components of the console 810 in a different manner than described in conjunction with FIG. 8.

The application store 855 stores one or more applications for execution by the console 810. An application is a group of instructions, that when executed by a processor, generates content for presentation to the user. Content generated by an application may be in response to inputs received from the user via movement of the headset 805 or the I/O interface 815. Examples of applications include: gaming applications, conferencing applications, video playback applications, or other suitable applications.

The tracking module 860 calibrates the system 800 using one or more calibration parameters and may adjust one or more calibration parameters to reduce error in determination of the position of the headset 805 or of the I/O interface 815. For example, the tracking module 860 communicates a calibration parameter to the DCA 850 to adjust the focus of the DCA 850 to more accurately determine positions of structured light elements captured by the DCA 850. Calibration performed by the tracking module 860 also accounts for information received from the IMU 835 in the headset 805 and/or an IMU 835 included in the I/O interface 815. Additionally, if tracking of the headset 805 is lost (e.g., the DCA 850 loses line of sight of at least a threshold number of structured light elements), the tracking module 860 may re-calibrate some or all of the system 800.

The tracking module 860 tracks movements of the headset 805 or of the I/O interface 815 using information from the DCA 850, the one or more position sensor 630, the IMU 835 or some combination thereof. For example, the tracking module 860 determines a position of a reference point of the headset 805 in a mapping of a local area based on information from the headset 805. The tracking module 860 may also determine positions of the reference point of the headset 805 or a reference point of the I/O interface 815 using data indicating a position of the headset 805 from the IMU 835 or using data indicating a position of the I/O interface 815 from an IMU 835 included in the I/O interface 815, respectively. Additionally, in some embodiments, the tracking module 860 may use portions of data indicating a position or the headset 805 from the IMU 835 as well as representations of the local area from the DCA 850 to predict a future location of the headset 805. The tracking module 860 provides the estimated or predicted future position of the headset 805 and/or the I/O interface 815 to the engine 865.

In some embodiments, the engine 865 generates a three-dimensional mapping of the area surrounding the headset 805 (i.e., the "local area") based on information received from the headset 805. In some embodiments, the engine 865 determines depth information for the three-dimensional mapping of the local area based on information received from the DCA 850 that is relevant for techniques used in computing depth. The engine 865 may calculate depth information using one or more techniques in computing depth from the portion of the reflected light detected by the DCA 850, such as stereo based techniques, the structured light illumination technique, and the time-of-flight technique. In various embodiments, the engine 865 uses the depth information to, e.g., update a model of the local area, and generate content based in part on the updated model.

The engine 865 also executes applications within the system 800 and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual environment or in an environment augmenting the local area with additional content. Additionally, the engine 865 performs an action within an application executing on the console 810 in response to an action request received from the I/O interface 815 and provides feedback to the user that the action was performed. The provided feedback may be visual or audible feedback via the headset 805 or haptic feedback via the I/O interface 815.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
    a first waveguide display comprising:
        a waveguide configured to incouple image light from a source assembly via a grating on the waveguide, and emit a first portion of the image light from the waveguide via one or more additional gratings on the waveguide, the first waveguide display having a first field of view (FOV); and
    a second display assembly configured to emit a second portion of the image light, the second display assembly having a second FOV,
    wherein the first waveguide display and the second display assembly are tiled such that the emitted first portion of image light and the emitted second portion of image light create a tiled FOV from a perspective of an eyebox, and a seam between the first FOV and the second FOV is located in a peripheral region of the tiled FOV, the seam including a portion of the first FOV and a portion of the second FOV, further comprising:
    an eye tracker configured to determine a gaze direction of a user of the headset and
    a controller configured to:
        responsive to the determined gaze direction being within a threshold distance from the seam, instruct at least one of the first waveguide display and the second display assembly to adjust brightness of emitted image light such that light which forms the portion of the first FOV and light which forms the portion of the second FOV are within a threshold value of each other.

2. The headset of claim 1, wherein the second display assembly is curved.

3. The headset of claim 1, wherein the second display assembly is a waveguide display.

4. The headset of claim 3, wherein the first waveguide display includes the first source assembly that generates the first portion of the image light, and the second display assembly includes a second source assembly that generates the second portion of the image light.

5. The headset of claim 4, wherein the first waveguide display receives the first portion of the image light from a source assembly and the second display assembly receives the second portion of the image light from the source assembly.

6. The headset of claim 1, wherein the second display assembly includes a projector and a reflector, and the projector projects the second portion of the image light onto the reflector, and the reflector reflects the second portion of the image light over the second FOV towards the eyebox.

7. The headset of claim 1, wherein the seam is located at least 35 degrees off center, where center is a direction that corresponds to a gaze direction of an eye of a user of the headset looking straight ahead.

8. The headset of claim 1, wherein the threshold value is such that brightness, as viewed from the eyebox, appears to be substantially uniform across the seam and portions of the first FOV and the second FOV that are adjacent to the seam.

9. The headset of claim 1, wherein the first waveguide display includes a waveguide and a portion of the waveguide along the seam is cut at a right angle.

10. A display block comprising:
    a first waveguide display comprising:
        a waveguide configured to incouple image light from a source assembly via a grating on the waveguide, and emit a first portion of the image light from the waveguide via one or more additional gratings on the waveguide, the first waveguide display having a first field of view (FOV); and
    a second display assembly configured to emit a second portion of the image light, and the first waveguide display and the second display assembly are tiled such that the emitted first portion of image light and the emitted second portion of image light create a tiled FOV from the perspective of an eyebox, and a seam between the first FOV and the second FOV is located in a peripheral region of the tiled FOV, the seam including a portion of the first FOV and a portion of the second FOV, further comprising:
    an eye tracker configured to determine a gaze direction of a user of the headset and
    a controller configured to:
        responsive to the determined gaze direction being within a threshold distance from the seam, instruct at least one of the first waveguide display and the second display assembly to adjust brightness of emitted image light such that light which forms the portion of the first FOV and light which forms the portion of the second FOV are within a threshold value of each other.

11. The display block of claim 10, wherein the second display assembly is curved.

12. The display block of claim 10, wherein the second display assembly is a waveguide display.

13. The display block of claim 12, wherein the first waveguide display includes the first source assembly that generates the first portion of the image light, and the second display assembly includes a second source assembly that generates the second portion of the image light.

14. The display block of claim 12, wherein the first waveguide display receives the first portion of the image light from a source assembly, and the second display assembly receives the second portion of the image light from the source assembly.

15. The display block of claim 10, wherein the second display assembly includes a projector and a reflective element, and the projector projects the second portion of the image light onto the reflective element, and the reflective element reflects the second portion of the image light over the second FOV towards the eyebox.

16. The display block of claim 10, wherein the seam is located at least 35 degrees off center, where center is a direction that corresponds to a gaze direction of an eye of a user looking straight ahead.

17. The display block of claim 10, wherein the first waveguide display includes a waveguide and a portion of the waveguide along the seam is cut at a right angle.

18. A method comprising:
  incoupling image light from a source assembly into a waveguide via a grating on the waveguide, wherein the waveguide is part of a first waveguide display;
  emitting a first portion of image light from one or more additional gratings on the waveguide such that the first portion of image light emitted from the first waveguide display has a first field of view (FOV); and
  emitting a second portion of the image light from a second waveguide display having a second FOV, and the first waveguide display and the second display assembly are tiled such that the emitted first portion of image light and the emitted second portion of image light create a tiled FOV from the perspective of an eyebox, and a seam between the first FOV and the second FOV is located in a peripheral region of the tiled FOV, wherein the seam includes a portion of the first FOV and a portion of the second FOV, further comprising:
  determining a gaze direction of a user; and
  responsive to the determining that the gaze direction is within a threshold distance from the seam, instructing at least one of the first waveguide display and the second display assembly to adjust brightness of emitted image light such that light which forms the portion of the first FOV and light which forms the portion of the second FOV are within a threshold value of each other.

\* \* \* \* \*